United States Patent
Davies (10) Patent No.: US 9,936,827 B2
(45) Date of Patent: Apr. 10, 2018

(54) PICTURE FRAME HANGER

(71) Applicant: Laurence Davies, Winnipeg (CA)

(72) Inventor: Laurence Davies, Winnipeg (CA)

( * ) Notice: Subject to any disclaimer, the term of this patent is extended or adjusted under 35 U.S.C. 154(b) by 0 days.

(21) Appl. No.: 15/048,648

(22) Filed: Feb. 19, 2016

(65) Prior Publication Data
US 2017/0238731 A1    Aug. 24, 2017

(51) Int. Cl.
*A47G 1/20*    (2006.01)
*A47G 1/16*    (2006.01)
*G01C 9/12*    (2006.01)

(52) U.S. Cl.
CPC .......... *A47G 1/164* (2013.01); *A47G 1/205* (2013.01); *G01C 9/12* (2013.01)

(58) Field of Classification Search
USPC .... 248/475.1, 476, 477, 478, 489, 495, 496, 248/317, 323, 330.1; 33/613, 391
See application file for complete search history.

(56) References Cited

U.S. PATENT DOCUMENTS

| | | | |
|---|---|---|---|
| 3,955,790 A * | 5/1976 | Ballin | A47G 1/1606 248/489 |
| 4,843,725 A * | 7/1989 | Harris | G01C 9/12 33/391 |
| 9,107,520 B1 * | 8/2015 | Davies | A47G 1/1606 |

* cited by examiner

*Primary Examiner* — Alfred Wujciak
(74) *Attorney, Agent, or Firm* — Adrian D. Battison; Ade & Company Inc.; Michael R. Williams (57) ABSTRACT

A frame which has a wire extending across a rear of the frame is hung on a wall by an integral flexible spring member shaped to define a center mounting plate fastened to lie flat on the wall and a spring strap standing at right angles to the plate with a pair of arms each extending outwardly from the mounting plate along the wall to a respective side of the mounting plate. The arms receive and locate the wire extending along the arms and depending from ends of the arms to the sides of the frame. The arms can flex and the arms allow longitudinal movement of the wire along the arms to allow movement of the frame side to side relative to the mounting plate. A stiffening rod can be inserted onto the strap.

20 Claims, 6 Drawing Sheets

FIG. 12

PICTURE FRAME HANGER

This invention relates to a hanger device for mounting a frame or other hanging element on a wall so as to be suspended along the wall from the hanger.

Typically such suspended frames include a wire attached at ends of the wire at or adjacent the sides of the frame with the wire extending loosely across the rear of the frame. The wire is then hung over a nail or other fastener penetrating into the wall. Sometimes where the object is heavy, the user applies two wall fasteners at spaced positions across the rear. In all cases, locating the frame in a required position and preventing the frame from tilting side to side is difficult and remains an issue of concern in almost all homes and workplaces where such frames are hung.

The term picture frame as used herein is defined to include other components such as mirrors, photograph frames, art frames and any other structure or object which uses the conventional wire mounting system strung across the rear of the frame.

In U.S. Pat. No. 9,107,520 of the present applicant filed Sep. 8, 2014 and issued Aug. 18, 2015 discloses a hanger device for a picture type frame which has a wire extending across a rear of the frame is hung on a wall by an integral flexible spring member shaped to define a center mounting plate fastened to lie flat on the wall and a spring strap standing at right angles to the plate with a pair of arms each extending outwardly from the mounting plate along the wall to a respective side of the mounting plate. The arms receive and locate the wire extending along the arms and depending from ends of the arms to the sides of the frame. The arms can flex and the arms allow longitudinal movement of the wire along the arms to allow movement of the frame side to side relative to the mounting plate. A stiffening rod can be inserted onto the strap

SUMMARY OF THE INVENTION

It is one object of the present invention to provide an improved arrangement of the type shown in the above patent.

According to one aspect of the invention there is provided an apparatus for hanging an object by a wire of the object on a wall, where the wire extends across a rear of the object and is connected to the object at or adjacent the sides of the object, the apparatus comprising:

a center mounting portion having a mounting surface arranged to lie flat on the wall and to be attached thereto by one or more fasteners;

a spring strap carried by the center mounting portion and having a pair of arms each extending outwardly from the mounting portion along the wall to a respective side of the mounting portion;

and a plumb member arranged to be mounted on the center mounting portion so as to depend from a support thereon;

the center mounting portion including a marker arranged to align with the plumb member when depending from the support to indicate when the center mounting portion is in a vertical position.

Preferably the center mounting portion includes at least two locating members for holding the center mounting portion in the vertical position.

Preferably the marker is located at a bottom of the center mounting portion and the support is located at a position above the marker.

Preferably the support is located below the spring strap.

Preferably the support is located on a front face of the center mounting portion facing away from the wall.

Preferably the support comprises a cylindrical post over which a collar of the plumb member engages to suspend the plumb member on the post.

Preferably the post stands forwardly of a front face of the center mounting portion so that the plumb member is freely suspended.

Preferably the post includes a radially projecting shoulder and the collar includes a recess to pass over the shoulder at an angular orientation spaced from the vertical position.

Preferably the center mounting portion and the spring strap are injection molded as an integral structure and wherein the plumb member is formed as a part of the integral structure which is attached by at least one frangible fastener allowing the plumb member to be held in place as part of the integral structure and broken away from the integral structure to be attached onto the support.

Preferably the plumb member is attached underneath one of the arms.

Preferably the arms of the spring strap are arranged to receive the wire of the object extending along the arms so that the wire is carried on the arms and depends from ends of the arms to the sides of the object and wherein the arms of the spring strap are flexible under the weight of the object so flex downwardly from the mounting portion to the ends and wherein the flexing of the arms acts to hold the object when adjusted level to reduce side to side tilting of the object.

According to a second aspect of the invention there is provided an apparatus for hanging an object by a wire of the object on a wall, where the wire extends across a rear of the object and is connected to the object at or adjacent the sides of the object, the apparatus comprising:

a center mounting portion having a mounting surface arranged to lie flat on the wall and to be attached thereto by one or more fasteners;

a pair of arms each extending outwardly from the mounting portion along the wall to a respective side of the mounting portion;

and a plumb member arranged to be mounted on the center mounting portion so as to depend from a support thereon;

the center mounting portion including a marker arranged to align with the plumb member when depending from the support to indicate when the center mounting portion is in a vertical position;

wherein the center mounting portion and the arms are injection molded as an integral structure;

and wherein the plumb member is formed as a part of the integral structure which is attached by at least one frangible fastener allowing the plumb member to be held in place as part of the integral structure and broken away from the integral structure to be attached onto the support.

Preferably the plumb member is attached underneath one of the arms.

Preferably the apparatus has the advantage that the flexing of the arms acts to hold the object when adjusted level to reduce side to side tilting of the object.

Preferably the spring strap comprises an arch at least when loaded with the weight of the object and may be arched when unloaded to assist in locating the wire. The spring strap may form a single element extending across the full width or may be in effect formed as two separate arms both connected to the center mounting portion.

Preferably the arms have at each end thereof a member extending transverse to the arm and forming a groove or resistance through which the wire passes and arranged to apply frictional contact to the wire to reduce side to side movement of the wire relative to the center mounting portion along the wall to keep the wire located at the end.

Preferably the arms have at spaced positions along the arms a plurality of upturned tabs arranged to prevent the wire from slipping forwardly from a front edge of the strap or rearwardly from a rear edge of the strap. The tabs may be formed integrally with the strap.

In one arrangement, the spring member is stamped from a spring metal material.

However, more typically the spring member can be molded from a plastics material.

Preferably the center mounting portion includes a sleeve extending generally outwardly from the surface for guiding a fastener into engagement with the wall where preferably the sleeve is inclined upwardly and outwardly from the surface.

Preferably also the center mounting portion includes additional fastening holes adjacent to the sleeve for receiving additional fasteners for additional weight and so as to better hold the center mounting portion in a fixed position against tilting.

Preferably also the center mounting portion includes projecting elements extending outwardly from the surface for engaging into the wall again to provide a more stable connection to the wall.

In some cases the apparatus may be provided as a kit of parts with an additional flexible stiffening rod and the strap includes a receptacle shaped to receive the stiffening rod extending longitudinally along the strap by which a resistance to bending of the strap is increased to accommodate heavier objects. This allows a single component molded from a plastic material to accommodate both heavier and lighter objects while providing similar amounts of flexing of the arms to hold the object, regardless of whether it is a heavier object such as a large mirror or a lighter object such as a small photograph against side to side tilting Preferably the receptacle includes a pair of collars at respective ends of the strap for locating the ends of the stiffening rod.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

As shown in the above U.S. Pat. No. 9,107,520, FIGS. 1 through 9 show the apparatus 10 which is provided for hanging a frame 11 by a wire 12 of the frame on a wall 13. The wire 12 extends across a rear of the frame and is connected by fasteners 12A to the frame at or adjacent the sides 11A of the frame 11.

The apparatus is defined by an flexible spring member 15 shaped by suitable forming techniques from a spring steel material or molded plastics material to define a center mounting plate or portion 16 and a spring strap 17. The mounting portion 16 has a flat rear surface 161 arranged to lie flat on the wall 13 and to be attached thereto by a fastener 162. The mounting portion 16 has a width sufficient merely to provide an effective mounting and has a horizontal bottom edge 163 and a horizontal top edge 164 attached to the strap 17.

The spring strap includes a wall 171 at right angles to the surface 161 of the portion 16 and therefore to the wall 13 so as to stand outwardly from the wall 13. The spring strap has a pair of arms 172 and 173 each extending outwardly from the mounting portion 16 along the wall to a respective side of the mounting portion 16.

The arms 172 and 173 of the spring strap thus have a flat upper surface 174 defined by the wall 171 and are arranged to receive the wire 12 of the frame resting on the surface 174 with the wire extending along the arms 172 and 173 so that the wire is carried on the arms to the ends 175 and 176 of the arms.

The arms 172 and 173 have at spaced positions along the length thereof upstanding tabs 18 and 19 on a rear face of the surface 174 for resting against the wall. The strap 17 also includes a front tab 20 centrally of the apparatus at the mounting portion 16 at the front edge of the surface 174 for resting against the rear of the object.

Thus the wire 12 is confined to extend along the strap 17 to the ends 175 and 176 and depends from ends of the arms to the sides of the frame 11.

As shown in the Figures, the arms 172 and 173 of the spring strap are slightly arched in an initial undistorted or rest position as supplied. However the arms are flexible under the weight of the frame 11 so bend downwardly as shown at arrows D in FIG. 9 from the mounting plate to the arms 172 and 173 so as to form an arch shape of increased curvature.

The spring strap has a plurality of wire engaging elements or tabs 18, 19 and 20 thereon to hold the wire 12 so that the wire is confined between the tabs and extends along the strap as the arms bend downwardly. The tabs 18, 19, 20 and 23 are formed by molding in the plastics version or, in a spring steel version, by stamping an edge portion on the arms and by bending this portion upwardly at right angles to the strap.

The wire engaging elements and the arms allow frictional sliding longitudinal movement of the wire 12 along the arms 172 and 173 and therefore allow movement of the frame side to side relative to the mounting plate in an initial adjustment operation.

In an alternative arrangement, instead of placing the hanger first on the wall and hanging the wire over the arms, the arms and hanger can first be attached to the wire and located in the required position, following which the mounting plate is hung over a suitable fastener such as a screw or nail in the wall. Thus the single hole of the plate 16 may be replaced by key-hole slot or a hook arrangement.

There is thus provided an apparatus 10 for hanging an object 11 by a wire 12 of the object on a wall 13, where the wire 12 extends across a rear of the object and is connected to the object at or adjacent the sides of the object.

As explained above, the apparatus includes the flexible spring member 15 shaped to define the center mounting portion 16 having a mounting surface 161 arranged to lie flat on the wall 13 and to be attached thereto by one or more fasteners 162. The spring strap 17 carried by the center mounting portion 16 provides the surface 174 standing generally outwardly relative to the surface 161 and therefore to the wall 13. The spring strap 17 has a pair of arms 172 and 173 each extending outwardly from the mounting portion 16 along the wall to a respective side of the mounting portion.

The arms of the spring strap 17 are arranged to receive the wire 12 of the object extending along the arms so that the wire 12 is carried on the arms and depends from ends of the arms to the sides of the object. The arms 172 and 173 of the spring strap 17 are flexible under the weight of the frame 11 so that they flex downwardly from the mounting portion 16 to the ends 175, 176. The spring strap 17 has the plurality of wire engaging elements in the form of the tabs 18, 19 and 20 thereon to hold the wire so that the wire extends along the strap as the arms flex downwardly without the wire falling to the front or rear so that the wire follows the contour of the strap as it flexes. At each of the ends 175, 176 is provided a V-shaped notch member 21 extending transverse to the arm 17 and standing upwardly from the upper flat surface of the arm and forming a groove 211 through which the wire 12 passes and arranged to apply frictional contact to the side of the wire to better hold the wire and to reduce movement of the wire side to side across arms the to keep the wire located at the ends 175 and 176. Thus the weight of the object or frame even if significantly unbalanced does not cause the wire to slide across the arm and tilt to one side and instead the unbalance of the weight tends to be taken up in the arms and hold the object level even if unbalanced.

However the groove 211 and the wire tabs 18, 19, 20 and the upper surface of the arms allow longitudinal adjustment movement of the wire along the arms and therefore allow adjustment movement of the object side to side relative to the mounting plate and the arms. Thus the flexing of the arms acts to hold the object when adjusted level to reduce side to side tilting of the object. The groove 211 can be sharper than that shown with a narrower angle to provide a better frictional contact with the sides of the wire.

The rear half 212 of the notch member 21 includes a rearwardly inclined blade portion 22 extending longitudinally of the arm over a short distance at the end of the arm so as to engage the wall surface at the rear of the surface 174. Thus when the hanger is initially applied, it sits in contact with the wall with the blade having a top edge at the wall surface. In this way the wire of the frame slides down the wall as the frame is applied and is prevented by the blade 22 from engaging behind the surface 174 so that it lies onto the surface 174 in the required position. When the frame is properly engaged and released by the user, the frame tends to lean forward so that its top edge is forward of the wall and the wire is pulled forwardly. However the wire remains on the surface 174 retained by the guide tab 20 and the blades 22.

Figure 1:
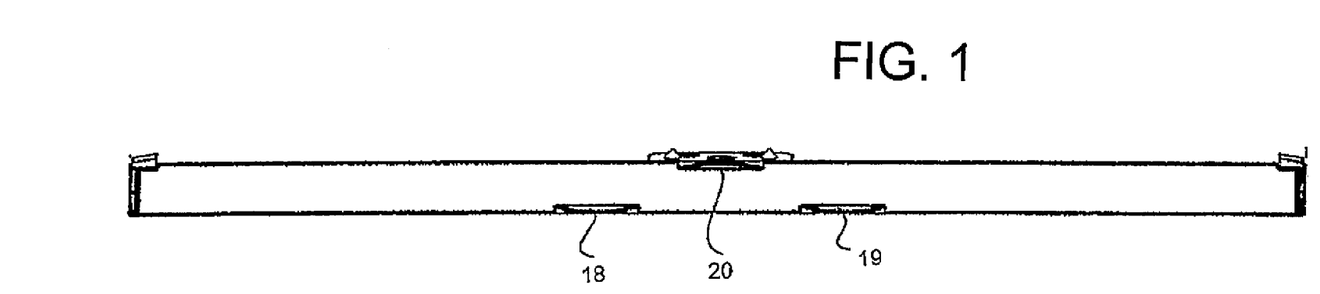
FIG. 1 is a top plan view of one embodiment of an apparatus according to the present invention.
Figures 2, 3:
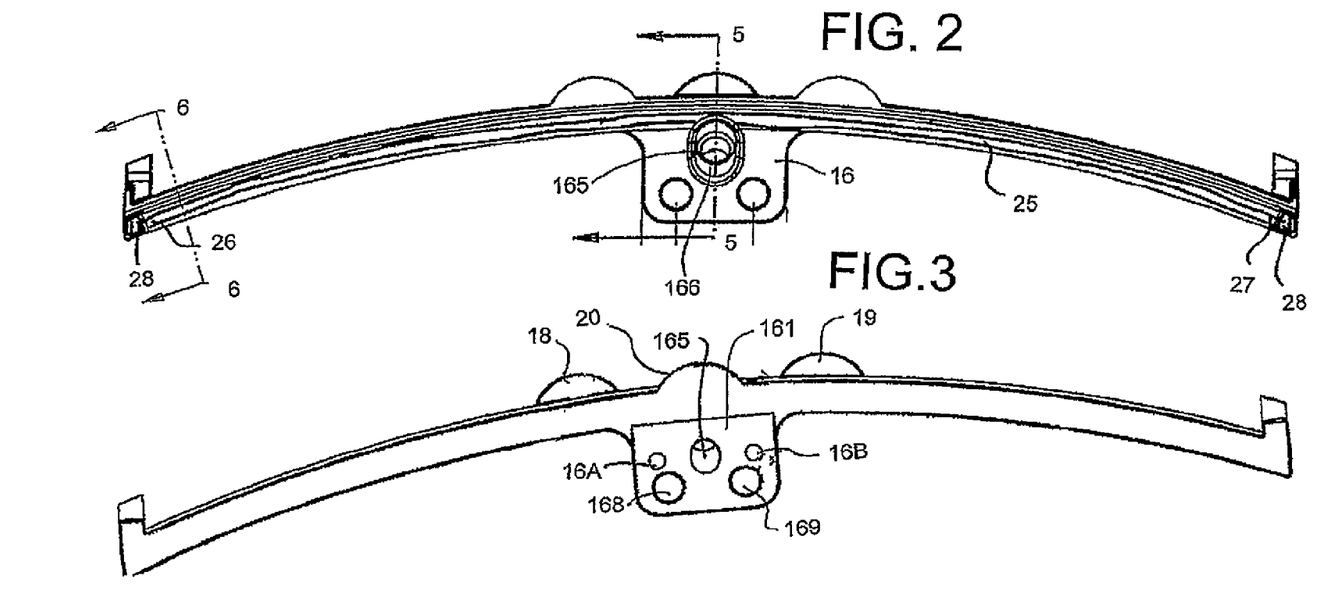
FIG. 2 is a front elevational view of the apparatus of FIG. 1 with a stiffening rod in place on the support strap member.
FIG. 3 is a rear elevational view of the apparatus of FIG. 1.
Figure 4:
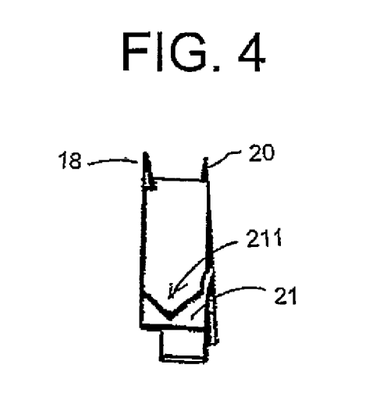
FIG. 4 is a side elevational view of the apparatus of FIG. 1.
Figure 5:
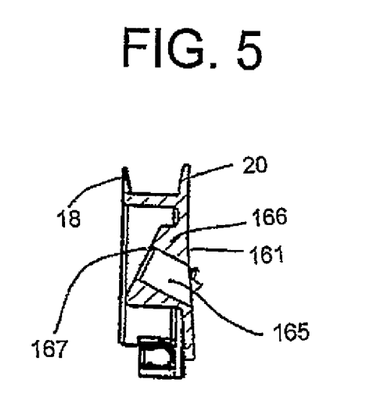
FIG. 5 is a cross-sectional view along the lines 5-5 of FIG. 2 of the apparatus of FIG. 1.
Figure 6:
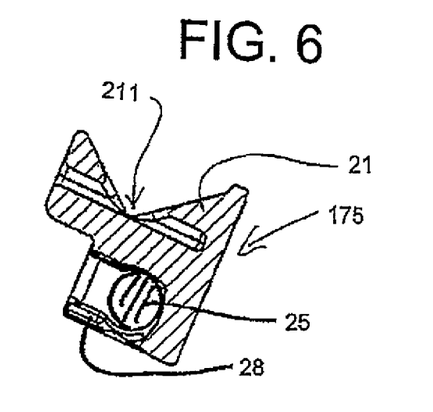
FIG. 6 is a cross-sectional view along the lines 6-6 of FIG. 2 of the apparatus of FIG. 1.
Figures 7, 8:
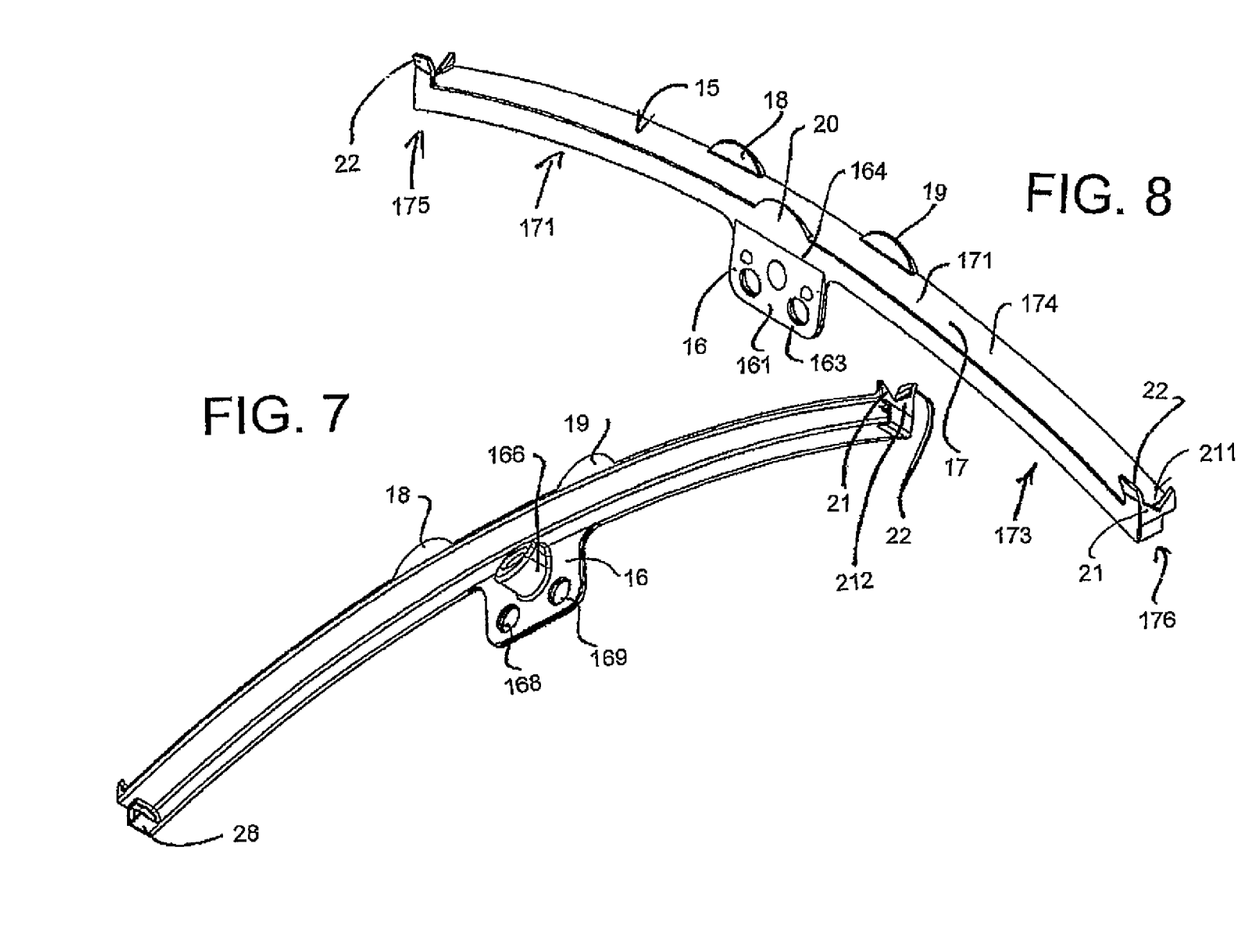
FIG. 7 is an isometric view from the front and one side of the apparatus of FIG. 1.
FIG. 8 is an isometric view from the rear and one side of the apparatus of FIG. 1.
Figure 9:
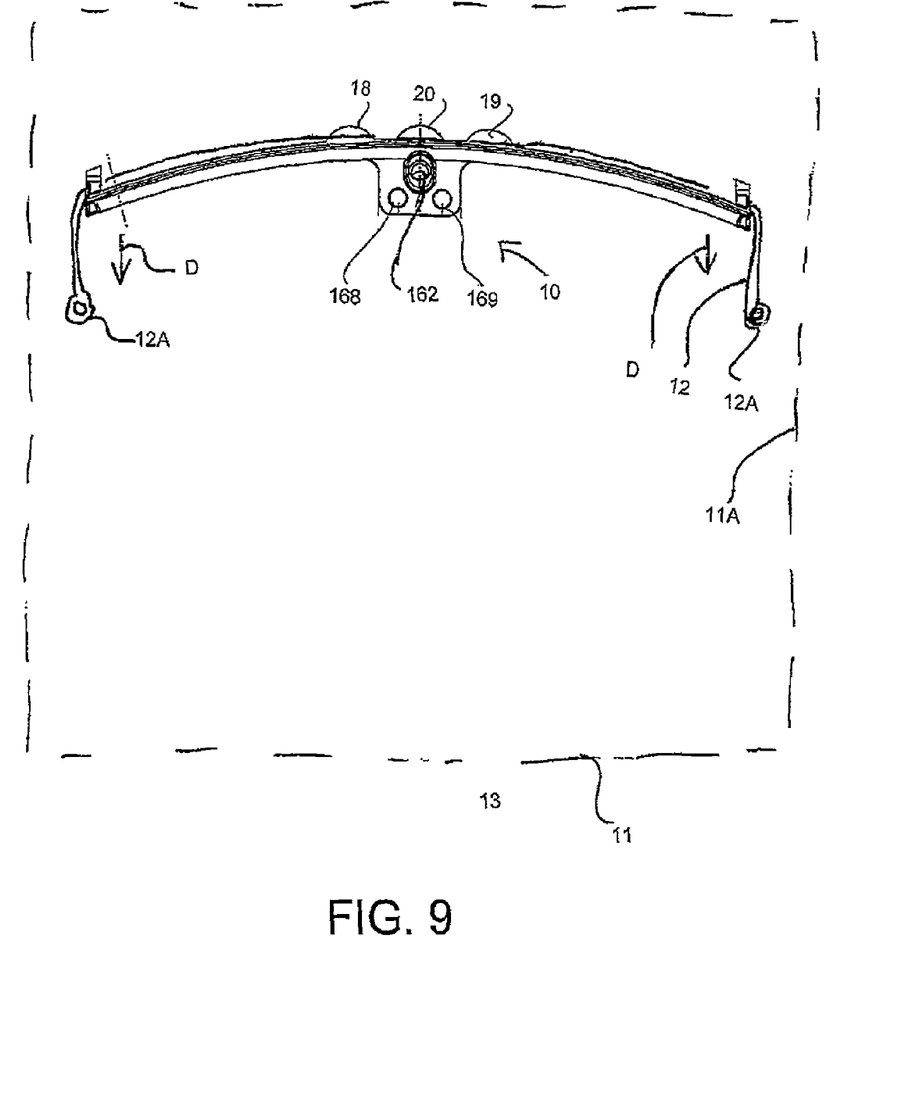
FIG. 9 is a front elevational view of the apparatus of Figure when supporting an object by a wire on a wall surface.

The center mounting portion 16 includes three holes for use in fastening the rear surface 161 to the wall. A main central opening 165 for receiving the fastener 162 includes a sleeve 166 extending generally outwardly from the surface 161 for guiding the fastener 162 into engagement with the wall so that a head of the fastener abuts against the end 167 of the sleeve to hold the surface 161 tight against the wall. The sleeve 166 is inclined upwardly and outwardly from the surface. The center mounting portion 16 includes additional fastening holes 168, 169 adjacent to and on either side of the sleeve 166 for receiving additional fasteners if required for increased stability or to accommodate increased weight. The size of the plate can be larger to provide sufficient space to receive the three fasteners through the holes 162, 168 and 169. Further the rear surface 161 of the center mounting portion 16 includes pointed projecting elements 16A, 16B extending outwardly or rearwardly from the surface 161 for engaging into the wall again for increased stability. In cases where the object does not overload the flexibility of the arms, the arms are used alone to support the wire. However in some cases additional strength is required in which case an additional flexible stiffening rod 25 is provided which extends along the strap underneath the arms with ends 26 and 27 at the ends of the arms. In order to hold this stiffening rod in place when required, the underside of the arms as best shown in FIG. 6 includes a receptacle or collar 28 shaped to receive the end of the stiffening rod to hold the rod in position extending longitudinally along the strap. The stiffening rod is thus held in place underneath the strap 17 by the end receptacles 28 and by the head of the fastener 162 at the center. The stiffening rod provides a resistance to bending of the strap is increased to accommodate heavier objects.

Figure 10:
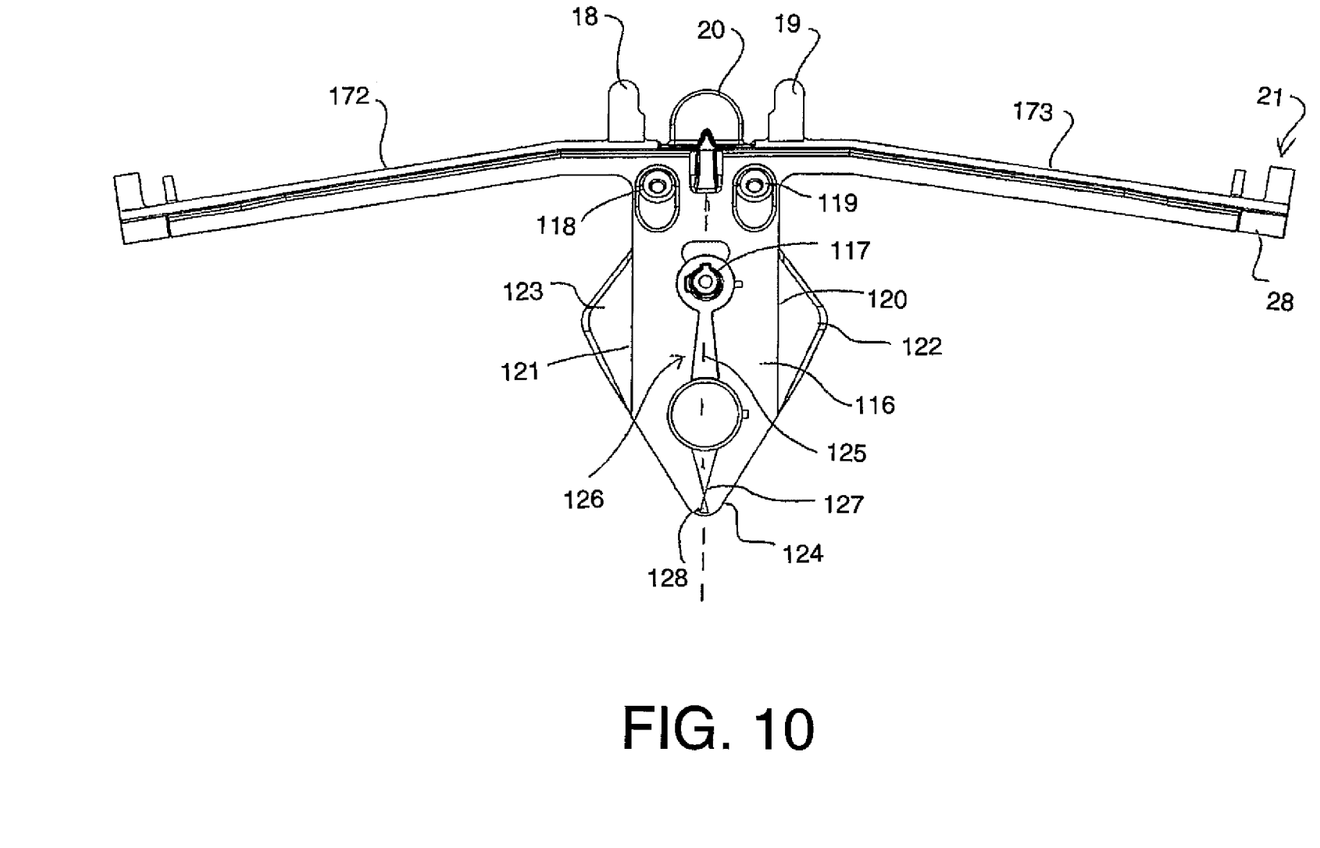
FIG. 10 is a front elevational view of a further embodiment of the apparatus according to the present invention showing the plumb member in operation.
Figures 11, 12:
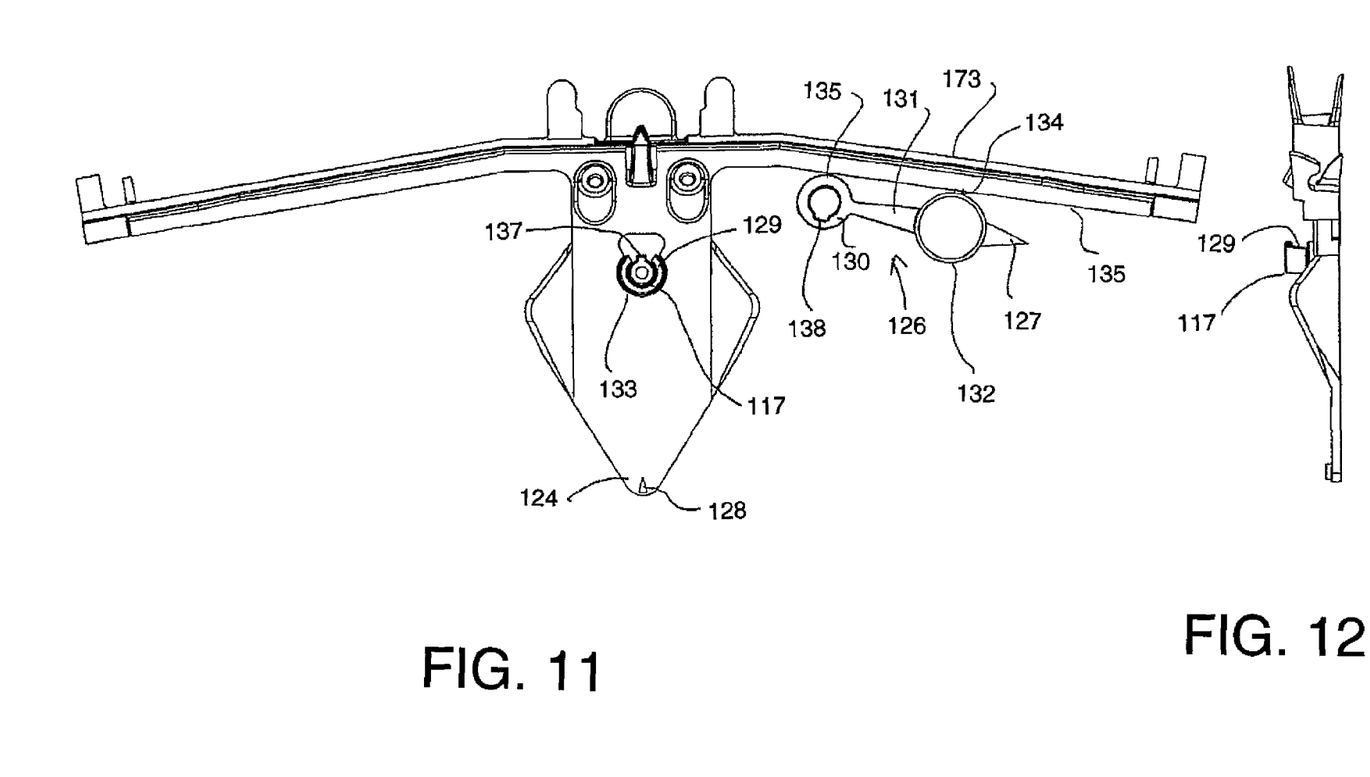
FIG. 11 is a similar front elevational view FIG. 10 showing the apparatus with the plumb member attached as part of the integral injection moulding.
FIG. 12 is a side elevational view of the apparatus of FIG. 11.

Turning now to FIGS. 10, 11 and 12, there is shown a modification of the apparatus as described above. In this embodiment the construction is formed as an integral injection molding defining the center mounting portion 116 and the spring strap 17 including the arms 172, 173. The arms also include the tabs previously described. The centre mounting portion is indicated at 116 which depend downwardly from the spring strap 17 and forms a generally flat centre plate member with three sleeves 117, 118 and 119 each arranged to receive a fastener such as a screw or nail so as to pass through the plate member in to the wall all of the support surface to mount the centre mounting portion on the wall. Typically a first fastener is inserted through the sleeve 117 so as to initially locate the centre mounting portion required position, following which the centre mounting portion with the arms carried there and is arranged in the proper vertical position by twisting the mounting portion to the left or to right as required to locate the proper vertical position. In this position for the fasteners are inserted through the sleeves 118 and 119 to hold the mounting plate in the required fixed position for further operation by supporting the picture all of the frame by its wire on the arms as previously described.

The mounting plate is formed by the generally flat centre section with side edges 120 and 121 and includes the side stiffening flanges 122 and 123 on either side of a centerline 125 passing through the centre of the mounting plate 116 and extending downwardly to a bottom apex 124 of the bottom of the generally rectangular mounting plate.

In order to properly orient the centerline 125 in and accurately vertical orientation, there is provided a plumb member 126 which is arranged to be mounted on the post 117 so as to hang from the post with a bottom apex 1 to 7 of the plumb member pointing downwardly along and accurately vertical line defined by the plumb member. The bottom apex 124 of the mounting plate includes a marker 128 with an upwardly pointing apex arranged to accurately align with the bottom apex 127 of the plumb member when the centerline 125 is accurately vertical as defined by the bottom apex of the plumb member.

The post 117 which also acts as a guide for the first fastener has a central hole through which the fastener can be inserted. The post 117 also includes a cylindrical support surface 129 surrounding the post onto which a collar 130 of the plumb member 126 can be mounted for free rotation of the collar around the post to accurately take up the vertical position.

The support 117 is located at a position generally central of the mounting plate so that it is located below the spring arch and above the bottom marker 128. This leaves room for a length of the plumb member which is sufficient to accurately define the vertical line. Thus the support is located on the front face of the centre mounting plate facing away from the wall surface onto which the device is attached. The post 117 bus projects forwardly from the mounting plate and is carried on a support portion 133 so as to hold the post and the plumb member thereon space forwardly from the mounting plate to avoid frictional engagement with the mounting plate. In this way the plumb member is freely suspended on density rotates around the post.

As shown best in FIG. 11, the plumb member includes the collar 130 and a leg 131 extending from the collar downwardly to the apex 127. On the leg is mounted a disk shaped receptacle 132 which is arranged to receive a weight inserted into a receptacle so as to increase the mass of the plumb member to better take up an accurate vertical position and to maintain that position while the mounting plate is twisted side to side.

In an initial position of the plumb member shown in FIG. 11, the plumb member is formed as part of the integral structure formed in the injection moulding process. Thus the plumb member includes frangible fasteners 134 and 135 located at the receptacle 132 and the collar 130 respectively which attach the plumb member to the arm 173 at a bottom surface 136 of the arm. The during injection moulding the plumb member and the mounting device are injection moulded as a common structure with the plumb member attached by the small tabs forming frangible connections. When supplied in package form, therefore, the apparatus remains as an integral structure with the plumb member attached. However the user when extracting the apparatus for use and simply break away the plumb member from its attached position on the arm 173 and can apply it to the post 117 for operation. In order to hold the plumb member in place on the post 117, the cylindrical surface 129 includes a regularly projecting shoulder 137 which holds the collar 130 in place after mounting on the post. In order to place the collar on the post, the collar includes a recess 138 through which the sold out 137 can pass when the plumb member is arranged at 90° around the post 117 from its vertical operating position.

The invention claimed is:

1. Apparatus for hanging an object by a fastener of the object on a wall, where the fastener extends across a rear of the object, the apparatus comprising:
    a center mounting portion having a mounting surface arranged to lie flat on the wall and to be attached thereto by one or more fasteners;
    a spring strap carried by the center mounting portion and having a pair of arms each extending outwardly from the mounting portion along the wall to a respective side of the mounting portion;
    and a plumb member arranged to be mounted on the center mounting portion so as to depend pivotally from a support member thereon;
    the center mounting portion including a marker arranged to align with the plumb member when depending from the support member to indicate when the center mounting portion is in a vertical position.

2. The apparatus according to claim 1 wherein the center mounting portion includes at least two locating members for holding the center mounting portion in the vertical position.

3. The apparatus according to claim 1 wherein the marker is located at a bottom of the center mounting portion and the support is located at a position above the marker.

4. The apparatus according to claim 1 wherein the support member is located below the spring strap.

5. The apparatus according to claim 1 wherein the support member is located on a front face of the center mounting portion facing away from the wall.

6. Apparatus for hanging an object by a fastener of the object on a wall, where the fastener extends across a rear of the object, the apparatus comprising:
    a center mounting portion having a mounting surface arranged to lie flat on the wall and to be attached thereto by one or more fasteners;
    a spring strap carried by the center mounting portion and having a pair of arms each extending outwardly from the mounting portion along the wall to a respective side of the mounting portion;
    and a plumb member arranged to be mounted on the center mounting portion so as to depend pivotally from a support member thereon;
    the center mounting portion including a marker arranged to align with the plumb member when depending from the support member to indicate when the center mounting portion is in a vertical position;
    wherein the support member comprises a cylindrical post over which a collar of the plumb member engages to suspend the plumb member on the post.

7. The apparatus according to claim 6 wherein the post stands forwardly of a front face of the center mounting portion so that the plumb member is freely suspended.

8. The apparatus according to claim 6 wherein the post includes a radially projecting shoulder and the collar includes a recess to pass over the shoulder at an angular orientation spaced from the vertical position.

9. The apparatus according to claim 6 wherein the center mounting portion includes at least two locating members for holding the center mounting portion in the vertical position.

10. The apparatus according to claim 6 wherein the support member is located on a front face of the center mounting portion facing away from the wall.

11. The apparatus according to claim 1 wherein the arms of the spring strap are arranged to receive the wire of the object extending along the arms so that the wire is carried on the arms and depends from ends of the arms to the sides of the object and wherein the arms of the spring strap are flexible under the weight of the object so flex downwardly from the mounting portion to the ends and wherein the flexing of the arms acts to hold the object when adjusted level to reduce side to side tilting of the object.

12. The apparatus according to claim 1 wherein the spring strap has a plurality of wire engaging elements thereon to hold the wire so that the wire extends along the strap as the arms flex downwardly.

13. The apparatus according to claim 1 wherein the spring strap comprises an arch.

14. The apparatus according to claim 1 wherein the arms have at each end thereof a member extending transverse to the arm and forming a groove through which the wire passes and arranged to apply frictional contact to the wire to reduce side to side movement of the wire to keep the wire located at the end.

15. The apparatus according to claim 1 wherein the arms have at spaced positions along the arms a plurality of upturned tabs arranged to prevent the wire from slipping forwardly from a front edge of the strap or rearwardly from a rear edge of the strap.

16. The apparatus according to claim 1 wherein the spring member is molded from a plastics material.

17. Apparatus for hanging an object by a fastener of the object on a wall, where the fastener extends across a rear of the object, the apparatus comprising:

a center mounting portion having a mounting surface arranged to lie flat on the wall and to be attached thereto by one or more fasteners;

a spring strap carried by the center mounting portion and having a pair of arms each extending outwardly from the mounting portion along the wall to a respective side of the mounting portion;

and a plumb member arranged to be mounted on the center mounting portion so as to depend pivotally from a support member thereon;

the center mounting portion including a marker arranged to align with the plumb member when depending from the support member to indicate when the center mounting portion is in a vertical position;

wherein the center mounting portion and the spring strap are injection molded as an integral structure and wherein the plumb member is formed as a part of the integral structure which is attached by at least one frangible fastener allowing the plumb member to be held in place as part of the integral structure and broken away from the integral structure to be attached onto the support member.

18. The apparatus according to claim 17 wherein the plumb member is attached underneath one of the arms.

19. The apparatus according to claim 17 wherein the center mounting portion includes at least two locating members for holding the center mounting portion in the vertical position.

20. The apparatus according to claim 17 wherein the support member is located on a front face of the center mounting portion facing away from the wall.

\* \* \* \* \*